US006771560B2

United States Patent
Lyon et al.

(10) Patent No.: US 6,771,560 B2
(45) Date of Patent: Aug. 3, 2004

(54) METHOD AND APPARATUS FOR ON-BOARD CALIBRATION IN PULSE-ECHO ACOUSTIC RANGING SYSTEM

(75) Inventors: Quinton Lyon, Peterborough (CA); Claude Mercier, Baie Comeau (CA)

(73) Assignee: Siemens Milltronics Process Instruments Inc., Ontario (CA)

( * ) Notice: Subject to any disclaimer, the term of this patent is extended or adjusted under 35 U.S.C. 154(b) by 0 days.

(21) Appl. No.: 10/447,105

(22) Filed: May 29, 2003

(65) Prior Publication Data

US 2004/0004905 A1 Jan. 8, 2004

(30) Foreign Application Priority Data

May 31, 2002 (CA) ............................................. 2388451

(51) Int. Cl.[7] .............................................. H04B 17/00
(52) U.S. Cl. ........................... 367/13; 367/99; 367/908
(58) Field of Search ........................... 367/13, 99, 908; 342/124, 174; 73/1.82

(56) References Cited

U.S. PATENT DOCUMENTS

| | | | | | |
|---|---|---|---|---|---|
| 4,170,765 A | * | 10/1979 | Austin et al. | ............... | 367/908 |
| 4,229,798 A | * | 10/1980 | Rosie et al. | ................ | 367/908 |
| 4,445,206 A | * | 4/1984 | Audenard | ..................... | 367/13 |
| 4,462,082 A | * | 7/1984 | Thiele et al. | ................. | 367/13 |
| 5,886,663 A | * | 3/1999 | Broxon, II et al. | ......... | 342/174 |
| 6,707,417 B2 | * | 3/2004 | Huettner et al. | ............ | 342/174 |

* cited by examiner

*Primary Examiner*—Ian J. Lobo
(74) *Attorney, Agent, or Firm*—Harness, Dickey & Pierce, P.L.C.

(57) ABSTRACT

A calibration module and methods for a time-of-flight ranging system. The calibration module may be built into the circuitry of the time-of-flight ranging system and allows various operating parameters to be measured and evaluated. The calibration modes include amplitude calibration, frequency calibration, and time delay calibration. The calibration mode also includes an electronic noise measurement mode. The calibration modes may be initiated on power-up or reset, or in response to user input or time-based trigger.

32 Claims, 3 Drawing Sheets

METHOD AND APPARATUS FOR ON-BOARD CALIBRATION IN PULSE-ECHO ACOUSTIC RANGING SYSTEM

FIELD OF THE INVENTION

The present invention relates to time-of-flight ranging or pulse-echo ranging systems, and more particularly to a method and apparatus for calibrating operation of the pulse-echo ranging system for level measurement applications.

BACKGROUND OF THE INVENTION

Pulse-echo acoustic ranging systems, also known as time-of-flight ranging systems, are commonly used in level measurement applications. Pulse-echo acoustic ranging systems determine the distance to a reflector (i.e. reflective surface) by measuring how long after transmission of a burst of energy pulses the echo or reflected pulses are received. Such systems typically use ultrasonic pulses or pulse radar signals.

Pulse-echo acoustic ranging systems generally include a transducer and a signal processor. The transducer serves the dual role of transmitting and receiving the energy pulses. The signal processor is for detecting and calculating the distance or range of the object based on the transmit times of the transmitted and reflected energy pulses.

Since the transmitted energy pulses are converted into distance measurements, any timing errors arising in the circuitry of the device result in distance measurement errors which degrade the accuracy of the level measurements. In most cases, timing errors are a result of temperature drift and drift over time in the operating characteristics of the electronics in the device circuitry. Accordingly, it is necessary to calibrate time-of-flight ranging systems not only at installation, but on a periodic basis as well in order to insure accurate level measurements.

While there is a need to periodically calibrate, the time-of-flight ranging systems are not always easily accessible after installation. In addition, there is a cost involved with a technician conducting calibration tests on an ongoing basis.

Accordingly, there remains a need to provide a system and techniques which facilitate calibration of pulse-echo or time-of-flight ranging systems while overcoming these and other perceived shortcomings.

BRIEF SUMMARY OF THE INVENTION

The present invention provides a calibration module and calibration techniques for a pulse-echo acoustic ranging or time-of-flight ranging systems.

In a first aspect, the present invention provides a time-of-flight ranging system comprising: (a) a transducer for emitting energy pulses and detecting reflected energy pulses; (b) a controller; (c) a transmitter operatively coupled to the controller, and the transducer having an input port coupled to the transmitter module and being responsive to a transmit pulse signal for emitting the energy pulses; (d) a receiver operatively coupled to the controller, and the transducer including an output coupled to the receiver for outputting a reflected pulse signal corresponding to a reflected energy pulse coupled by the transducer; (e) the receiver converting the reflected pulse signal for input by the controller and the controller including a component for determining time-of-flight measurements from the reflected pulse signal; (f) a calibration module having a loop-back component for bypassing the transducer and routing the transmit pulse signal to the receiver, and the controller including a calibration component for processing the output from the receiver.

In another aspect, the present invention provides a method for calibrating a time-of-flight ranging system, the time-of-flight ranging system includes a transducer for emitting energy pulses and detecting reflected energy pulses, a transmitter operatively coupled to a controller and the transducer being responsive to a transmit pulse signal for emitting the energy pulses, a receiver operatively coupled to the controller and having an input for receiving a reflected pulse signal corresponding to a reflected energy pulse from the transducer, the receiver converting the reflected pulse signal for input by the controller and the controller including a component for determining time-of-flight measurements associated with the reflected pulse signal, the calibration method comprises the steps of: (a) bypassing the transducer and looping back the transmit pulse signal to the receiver; (b) inputting an output signal generated by the receiver corresponding to the looped-back transmit pulse signal; (c) measuring characteristics associated with the output signal; (d) determining calibration parameters from the measured characteristics.

In a further aspect, the present provides a time-of-flight ranging system comprising: (a) emitter means for emitting energy pulses and detecting reflected energy pulses; (b) controller means; (c) transmitter means for transmitting a transmit pulse signal, the transmitter means being operatively coupled to the controller, and the emitter means having an input port coupled to the transmitter means and the emitter means being responsive to a transmit pulse signal for emitting the energy pulses; (d) receiver means for receiving a reflected pulse signal, the receiver means being operatively coupled to the controller means, and the emitter means including output means coupled to the receiver for outputting the reflected pulse signal corresponding to a reflected energy pulse coupled by the emitter means; (e) the receiver means including means for converting the reflected pulse signal for input by the controller means and the controller means including means for determining time-of-flight measurements from the reflected pulse signal; (f) means for bypassing the emitter means and routing the transmit pulse signal to the receiver means, and the controller means including calibration means for calibrating output from the receiver.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Reference will now be made to the accompanying drawings, which show, by way of example, an embodiment of the present invention, and in which.

DETAILED DESCRIPTION OF THE PREFERRED EMBODIMENT

Figure 1:
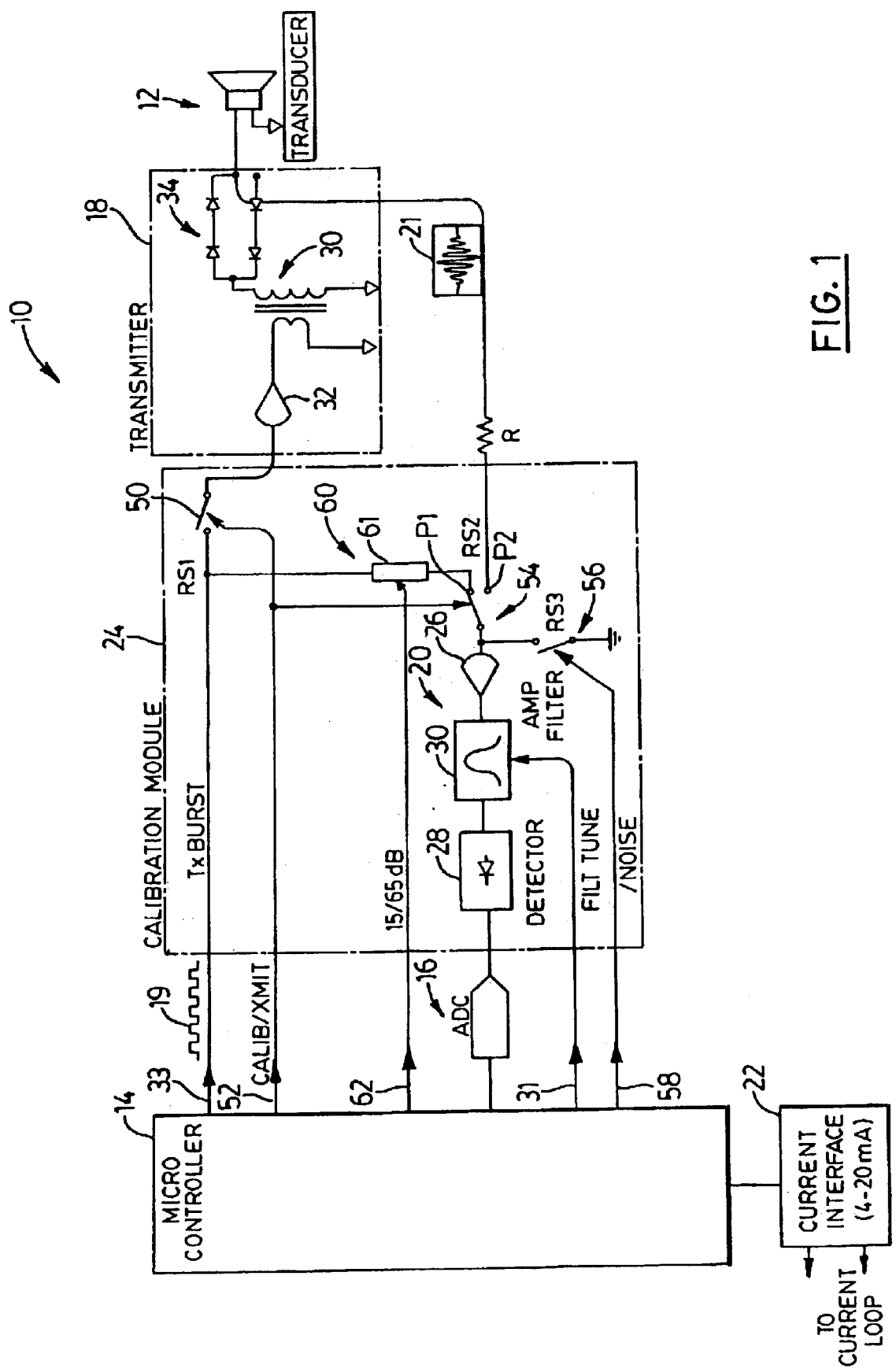
FIG. 1 is a schematic diagram of pulse-echo level measurement system having a calibration module according to the present invention.

Reference is first made to FIG. 1 which shows a pulse-echo level measurement system 10. In accordance with one aspect of the present invention, the pulse-echo level measurement system 10 includes a calibration module. As described in more detail below, the calibration module provides the capability to generate internal signals to measure errors which may arise in the electronic circuitry due to the effects of temperature drift and/or component drift over time. While the calibration module and its operation are described in the context of an ultrasonic based pulse-echo acoustic ranging device or time of flight ranging system, it will be understood that the calibration module is applicable to pulsed radar based systems and guided wave radar time domain reflectometry, i.e. TDR based systems.

As shown in FIG. 1, the pulse-echo acoustic ranging device 10 comprises an ultrasonic transducer 12, a microcontroller unit 14, an analog-to-digital converter 16, a transmitter 18, a receiver 20, a current (4–20 mA) loop interface module 22, and a calibration module indicated generally by reference 24.

Figure 2A:
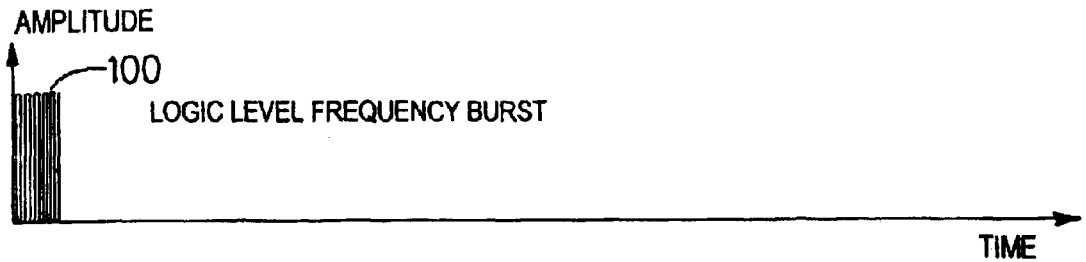
FIG. 2(a) shows in diagrammatic form a transmit pulse burst for the pulse-echo level measurement system of FIG. 1.

The transducer 12 is coupled to the microcontroller unit 14 through the transmitter 18. The microcontroller unit 14 applies a transmit pulse signal 19 to the transmitter 20 and the transducer 12 to emit the transmit pulse signal 19 as ultrasonic pulses 100 as shown in FIG. 2(a). The transmitter 18 comprises a step-up transformer 30, an input buffer 32, and a diode isolation network 34. As shown, the output of the input buffer 32 is coupled to the primary of the transformer 30 and the input of the buffer 32 is coupled to an output port 33 on the microcontroller 14 for the transmit pulse control signal 19. The diode isolation network 34 functions to isolate the transmitter 18 from the receiver 20 after the transmit pulse signal burst 19 has been transmitted. The transmit pulse signal 19 is coupled to the buffer 32 through a first signal routing control switch 50. The first signal routing control switch 50 functions as part of the calibration module 24 and the receiver 20. The first signal routing switch 50 is actuated by a control output 52 on the microcontroller 14. As will be described in more detail below, the signal routing control switch 50 is operated in transmit mode and calibration mode, and functions to prevent high voltage transmission during calibration.

The reflected or echo pulses, i.e. the propagated transmit pulses reflected by the liquid surface, are coupled by the transducer 12 and converted into an electrical signal, indicated by reference 21 in FIG. 1. The electrical signals 21 are fed to the receiver 20. As shown in FIG. 1, the receiver 20 comprises an amplifier 26, an envelope detector 28, and an adjustable filter 30. The microcontroller 14 includes a control output 31 for controlling, i.e. tuning, the adjustable filter 30 as will be described in more detail below. The adjustable filter 30 is used primarily by the calibration module 24 as described in more detail below. The electrical signal 21 output from the transducer 12 is fed to the amplifier 26 and the amplified output may be filtered by the filter 30 before being shaped by the envelope detector 28. The output from the envelope detector 28 is then sampled and digitized by the analog-to-digital converter 16. As shown in FIG. 1, a second signal routing control switch 54 is coupled to the input of the amplifier 26. The second signal routing switch 54 is actuated between position P1 and position P2. Position P1 is used in calibration mode, and position P2 is used in normal transmit mode. The second signal routing switch 54 is controlled by the control output 52 from the microcontroller 14 in transmit mode and calibration mode as will be described in more detail below.

Figure 2B:
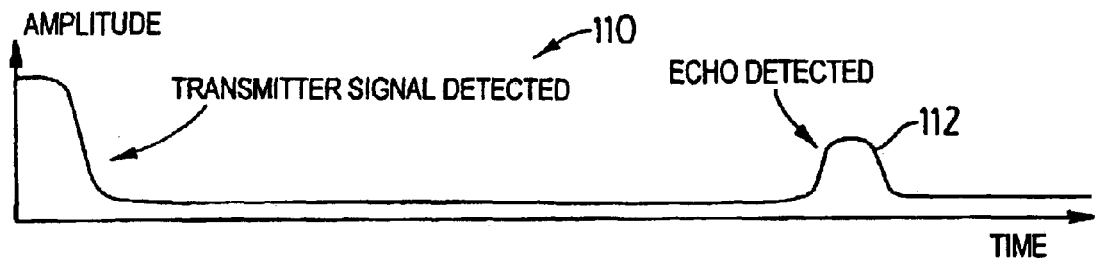
FIG. 2(b) shows in diagrammatic form a receive echo profile for the pulse-echo level measurement system of FIG. 1.
Figure 3A:
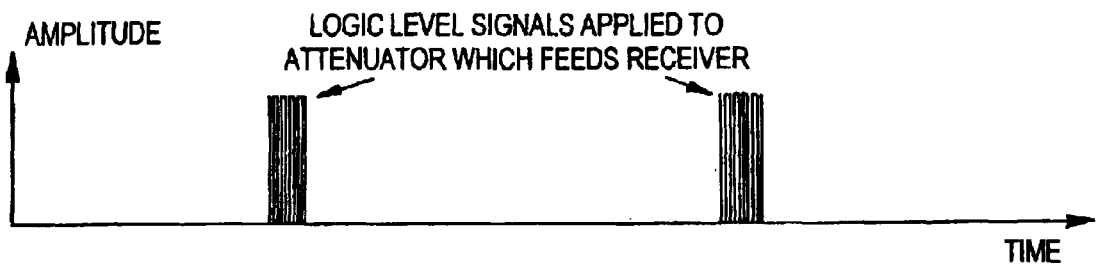
FIG. 3(a) shows in diagrammatic form transmit pulses for the calibration module according to one aspect of the present invention.
Figure 3B:
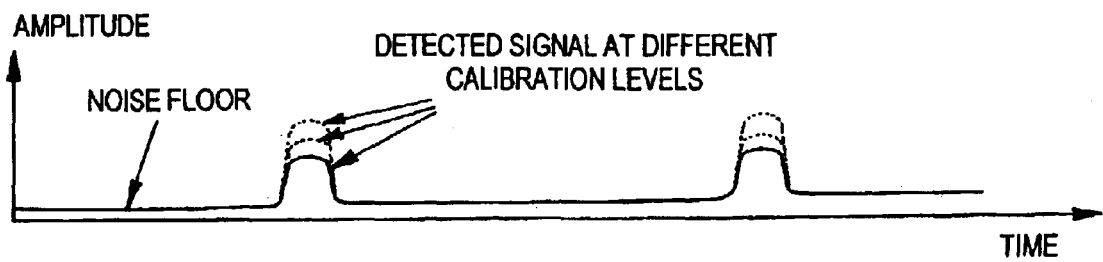
FIG. 3(b) shows in diagrammatic form a receive echo profile for the transmit pulses generated by calibration module in FIG. 3(a)

The pulse-echo level measurement device 10, e.g. an ultrasonic ranging device, is installed in a tank (not shown) containing the liquid, or other material. The top surface of the liquid provides a reflective surface or reflector which reflects the ultrasonic pulse generated from the emitter on the transducer 12. In normal operation, a transmitter pulse burst 100 as shown in FIG. 2(a) is emitted by the transducer 12 and corresponds to the transmit pulse signal 19 (FIG. 1) which is applied to the transducer 12. The reflected ultrasonic pulse is coupled by the transducer 12 and converted into electrical signals 21 (FIG. 1). The electrical signals 21 are applied to the receiver 20. In the receiver 20, the detected electrical signal output from the envelope detector 28 (FIG. 1) corresponding to the reflected ultrasonic pulses is sampled and digitized by the A/D converter 16 (FIG. 1). The microcontroller 14 takes the digitized output and generates a receive echo waveform 110 having a form as shown in FIG. 2(b). The receive echo waveform 110 is characterized by an echo pulse 112, i.e. the reflected ultrasonic pulse. The microcontroller unit 14 executes an algorithm which identifies and verifies the echo pulse 112 and calculates the range, i.e. the distance to the reflective surface, from the time it takes for the reflected ultrasonic pulse, i.e. echo pulse 112, to travel from the reflective surface to the transducer 12. From this calculation, the distance to the surface of the liquid and thereby the level of the liquid is determined. The microcontroller 14 also controls the transmission of data and control signals through the current loop interface 22. The microcontroller 14 is suitably programmed to perform these operations as will be within the understanding of those skilled in the art. In addition to these functions, the microcontroller 14 includes firmware to execute the functions associated with the calibration module 24 as described in more detail below.

Reference is again made to FIG. 1, the calibration module 24 as described above includes the first signal routing control switch 50, and the second signal routing control switch 54. Both of the signal routing switches 50, 54 are controlled by the calibration/transmit control signal on the control output 52 from the microcontroller 14. As will be described in more detail below, one of the principal functions of the calibration module 24 is to generate signals with known characteristics and then use the response to measure errors arising from the circuitry for the pulse-echo level measurement system 10 for example due to temperature and component drift with time.

Referring again to FIG. 1, the calibration module 24 also includes a third signal routing control switch 56. The third signal routing switch 56 is actuated by a control output 58 under the control of firmware in the microcontroller 14. The microcontroller 14 uses the third signal routing switch 56 to estimate the signal detection threshold and to measure the noise floor on the operation of the receiver 20. The calibration module 24 also includes an attenuator circuit indicated by reference 60. The attenuator circuit 60 comprises a voltage attenuator with a fixed output impedance voltage 61. The input to the voltage attenuator 61 is coupled to the transmit control output 33 on the microcontroller 14, and the output from the voltage attenuator 61 is coupled to the other input of the signal routing switch 54. The attenuation value for the voltage attenuator 61 is adjusted by an output port 62 on the microcontroller 14 under the control of firmware. By actuating the signal routing switch 54 to couple the output from the attenuator 60 a signal with known characteristics is injected into the receiver 20 for calibration purposes as described in more detail below.

Under the control of the microcontroller 14, there is a normal mode of operation and four calibration modes. The calibration modes include (1) amplitude calibration, (2) time delay calibration, (3) frequency calibration, and (4) electronic noise performance. Amplitude calibration mode is used to determine receiver offset and gain. Time delay calibration mode is used to precisely calculate the time delay through the receiver 20. Frequency calibration mode is used to adjust for frequency variations of the transducer 12. Electronic noise performance mode is used to determine the electronic noise present in the receiver 20, or the noise that may be present as a result of ambient EMI.

For the normal or transmit mode of operation, i.e. time of flight measurement, the first routing switch 50 is closed, and the third routing switch 56 is open. The second routing switch 54 is toggled to position P2 to couple the received electrical signals 21 (FIG. 1) to the amplifier 26 in the receiver 20. A transmit pulse burst such as shown in FIG. 2(a) is transmitted by the transducer 12 in response to the transmit logic pulse signal 19 (FIG. 1) being applied by the microcontroller 14 to the amplifier 32 (FIG. 1) in the transmitter 18. In response, the transducer 12 emits ultrasonic pulses that propagate and are reflected by the surface of the liquid (or other material), the level of which is to be measured. The reflected signals are detected by the transducer 12 and corresponding electrical signals 21 are generated and outputted to the receiver 20. The electrical signals 21 are amplified by the amplifier 26, filtered by the filter 30 and shaped by the envelope detector 28 and then digitized by the A/D converter 16. The digitized output from the A/D converter 16 is processed by the microcontroller 14 under suitable firmware control and a receive echo waveform 110 of the form shown in FIG. 2(b) is generated. The receive echo waveform 110 is characterized by an echo pulse 112, i.e. corresponding to the reflected ultrasonic pulse. The microcontroller unit 14 executes an algorithm which identifies and verifies the echo pulse 112 and calculates the range, i.e. the distance to the reflective surface, from the time it takes for the reflected ultrasonic pulse, i.e. echo pulse 112, to travel from the reflective surface to the transducer 12. From this calculation, the distance to the surface of the liquid and thereby the level of the liquid is determined.

For operation in amplitude calibration mode, the first signal routing switch 50 is positioned in the open position as shown in FIG. 1. Referring still to FIG. 1, the third signal routing switch 56 is also set to the open position. The second signal routing switch 54 is actuated to position P1, i.e. calibration mode. In this configuration, the transmit logic pulse signal 19 generated on output 33 of the microcontroller 14 is routed to the input of the amplifier 26 via the voltage attenuator 61 in the receiver 20. Under control of firmware in the microcontroller 14, the voltage attenuator 61 is set to a first predetermined attenuation level, for example, 65 dB re 1 uV, and the transmit logic pulse signal 19 is applied to the receiver 20 through the routing switch 54. The resulting attenuated and digitized signal is used by the microcontroller 14 to measure a first amplitude signal. Next, the attenuator 60 is set by the microcontroller 14 on control port 62 to a second predetermined attenuation level, for example, 15 dB re 1 uV, and the same transmit logic pulse signal 19 (as generated for the first attenuation level) is applied to the receiver 20 through the routing switch 54 and the resulting attenuated and digitized signal is inputted by the microcontroller 14 to measure a second amplitude signal. Using the two different amplitude signals, the microcontroller 14 calculates the offset characteristic for the receiver 20 and the gain characteristic for the receiver 20. If the amplifier 26 comprises a logarithmic amplifier, then the offset and gain is determined in mV per dB. The implementation in firmware of the functions in for calculating the offset and gain characteristics is within the understanding of one skilled in the art.

Figure 4:
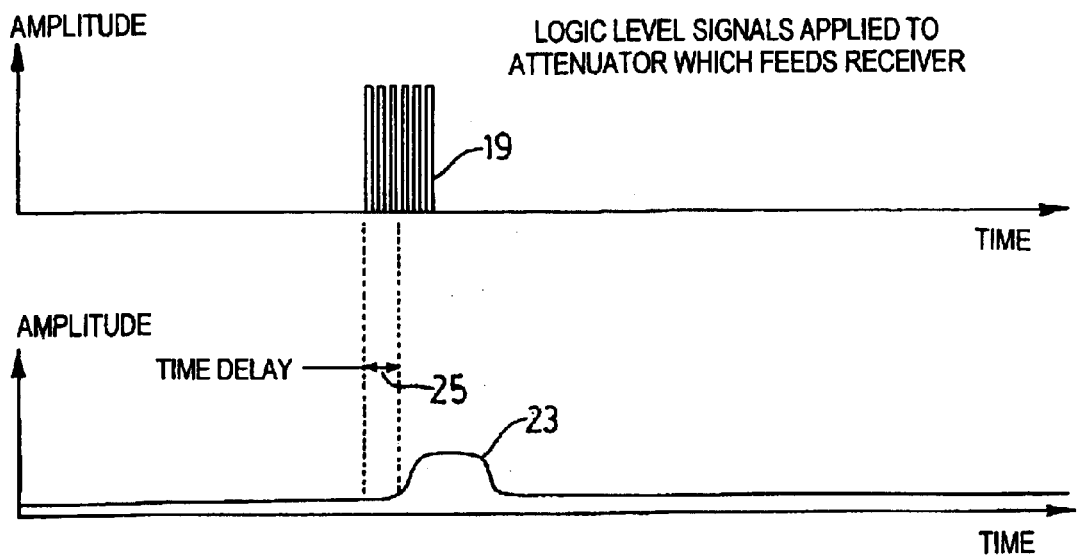
FIG. 4 shows in diagrammatic form transmit pulses and a receive echo profile in the calibration module for determining time delay for the receive echo.

Time delay calibration mode is used to precisely calculate the time delay through the receiver 20. In time delay calibration mode, the first signal routing switch 50 is positioned in the open position as shown in FIG. 1, and referring still to FIG. 1, the third signal routing switch 56 is also set to the open position. The second signal routing switch 54 is actuated to position P1, i.e. calibration mode. In this configuration, the transmit logic pulse signal 19 generated on output 33 of the microcontroller 14 is routed to the input of the amplifier 26 in the receiver 20. To determine the time delay, the transmit logic pulse signal 19 generated by the microcontroller 14 is switched on and off at precise intervals (as shown in FIG. 4), the microcontroller 14 determines the time it takes for a digitized signal 23 (as shown in FIG. 4) to be generated from the A/D converter 16. As shown in FIG. 4, there is a time delay indicated by reference 25 which represents the delay of receiver 20 in processing the transmit logic pulse signal 19, i.e. input signal, injected into the receiver 20. This time delay 25 corresponds to the delay in the receiver 20 for processing the electrical signals 21 for actual reflected pulses coupled by the transducer 12 (FIG. 1).

Frequency calibration mode is used to determine the frequency variations for the transducer 12. The frequency calibration may be done using the routing switch 50, 54, 56 configuration for amplitude configuration, with the first signal routing switch 50 and the third signal routing switch both being positioned in the open position, and the second signal routing switch 54 being set to position P1 as shown in FIG. 1. In this configuration, the transmit logic pulse signal 19 generated on output 33 of the microcontroller 14 is routed to the input of the amplifier 26 in the receiver 20. For frequency calibration, the transmit logic pulse signal 19 is generated and outputted by the microcontroller 14 at a desired frequency. Through the operation of the switches 50, 54, the transmit logic pulse signal 19 is routed to the amplifier 26 at the input of the receiver 20. The digitized signal is then measured by the microcontroller 14, and if the maximum amplitude is not present, the microcontroller 14 adjusts the adjustable filter 30, and the procedure is repeated until the desired amplitude level for the received signal is achieved.

The processing steps for the frequency calibration mode as described above are summarized as follows:

(1) the microcontroller 14 (FIG. 1) generates a transmit logic pulse signal 19 at a desired frequency;

(2) the received and digitized transmit logic pulse signal is measured by the microcontroller 14 and the adjustable filter 30 is adjusted. Step (1) and step (2) are repeated until a maximum value for the amplitude of the received signal is achieved;

(3) the adjustment setting for the filter 30 is stored in memory for later use, for example, when the system 10 is processing signals having the associated frequency characteristics.

In an alternative embodiment for frequency calibration mode, the microcontroller 14 sets the adjustable filter 30 to a predetermined value. The microcontroller 14 then generates the transmit logic pulse signal 19 with a set frequency, and measures the amplitude of the received and digitized transmit logic pulse signal 19. The microcontroller 14 repeatedly adjusts the frequency of the transmit logic pulse signal 19 until a maximum, i.e. peak, amplitude value is reached.

The processing steps for the alternative frequency calibration mode as described above are summarized as follows:

(1) the microcontroller 14 (FIG. 1) adjusts the settings on the adjustable filter 30, for example, from the minimum settings level.

(2) the microcontroller 14 varies the frequency of the transmit logic pulse signal 19 until a peak value is achieved for the corresponding received and digitized signal. The frequency for the peak amplitude is stored in memory.

(3) the microcontroller 14 repeats steps (1) and (2) until the highest or maximum settings level for the filter 30 is reached.

In addition to the frequency mode calibration operations described above, the adjustable filter 30 may be used for tracking changes in the temperature characteristics of the transducer 12 over time. Advantageously, the process according to this aspect of the present invention does not require prior knowledge of the temperature characteristics for the transducer 12. However, knowledge of the operating frequency for the transducer 12 is needed. The process involves the following steps:

(1) configuring the routing switches 50, 54, 56 (FIG. 1) in normal operation mode, i.e. the first routing switch 50 is closed, the second routing switch 54 is set to position P2, and the third routing switch 56 is open;

(2) the microcontroller 14 (FIG. 1) generates and transmits a transmit logic pulse signal 19 at the expected operating frequency of the transducer 12;

(3) the reflected receive signal 21 (FIG. 1) from the transducer 12 is processed and digitized by the receiver 20 (as described above). The microcontroller 14 then measures the amplitude of the digitized receive signal.

(4) the microcontroller 14 adjusts the frequency of the transmit logic pulse signal and the setting of the adjustable filter 30 to maximize the amplitude of the received signal, or other desired characteristics, for example, ringdown in the transducer 12. The setting for the adjustable filter 30 is then stored in memory for future use.

Electronic noise performance mode is used to determine the electronic noise, i.e. the noise floor, present in the receiver 20. To measure the electronic noise, input signals are removed and the following steps are followed:

(1) external input signals are removed by opening the first routing switch 50 (FIG. 1), and moving the second routing switch 54 to position P1 (i.e. internal loop back).

(2) the microcontroller 14 ceases generating/transmitting the transmit logic pulse signal 19.

(3) the microcontroller 14 measures the digitized signal input from the A/D converter 16 and derives noise floor level for the receiver 20 from these measurements.

The noise floor measurement provides an indication of the minimum signal level in the receiver 10. The noise floor measurement is also used to determine if there is any RF (radio frequency) interference.

In a further aspect, the microcontroller 14 may include functions in firmware to issue calibration reports indicating the results of the various calibration tests and identifying problems in system 10. The calibration reports may be conveniently transmitted over the current loop to a remote receiver, or digitally via a network and displayed on a display, e.g. a LCD.

The various calibration modes as described above may be run by the microcontroller 14 at any suitable time. Events which trigger a calibration include:

(1) power-up or reset;

(2) user originated self-test or calibration;

(3) a set amount of time has passed since the last calibration;

(4) there have been significant changes in temperature since the last calibration; or (5) the confidence level in the operation of the level measurement system 10 is low.

It will be appreciated that the calibration module and techniques as described above for the level measurement system 10 provide a number of advantages. First, the calibration module 24 may be built-in or integrated with the circuitry and firmware of the system 10. This allows lower cost components to be used because errors in component values can be measured and taken into account internally. Second, the need for factory calibration of the level measurement system 10 is reduced or eliminated because the calibration can be performed automatically, for example, as a self-test on power-up or by request from the installation technician. Third, using periodic calibration tests allows the microcontroller to compensate for drift associated with temperature and other component variations in the circuitry. This helps improve and maintain the distance (i.e. level) measurement accuracy of the system 10.

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A time-of-flight ranging system comprising:

(a) a transducer for emitting energy pulses and detecting reflected energy pulses;

(b) a controller;

(c) a transmitter operatively coupled to said controller, and said transducer having an input port coupled to said transmitter and said transducer being responsive to a transmit pulse signal for emitting said energy pulses;

(d) a receiver operatively coupled to said controller, and said transducer including an output coupled to said receiver for outputting a reflected pulse signal corresponding to a reflected energy pulse coupled by said transducer;

(e) said receiver converting said reflected pulse signal for input by said controller and said controller including a component for determining time-of-flight measurements from said reflected pulse signal;

(f) a calibration module having a loop-back component for bypassing said transducer and routing said transmit pulse signal to said receiver, and said controller including a calibration component for processing the output from said receiver.

2. The time-of-flight measurement system as claimed in claim 1, wherein said loop-back component comprises a first switch and a second switch, said first switch being coupled between said controller and said transmitter, and said second switch being coupled between said transducer and said receiver, and said first switch being responsive to a switching control signal from said controller for routing said transmit pulse signal to said transmitter, and said second switch being responsive to said switching control signal for routing said reflected pulse signal or said transmit pulse signal to said receiver.

3. The time-of-flight ranging system as claimed in claim 2, wherein said loop-back component further includes an attenuator, said attenuator being responsive to a control signal from said controller for attenuating said transmit pulse signal.

4. The time-of-flight ranging system as claimed in claim 1, wherein said calibration module includes a noise floor measurement component.

5. The time-of-flight ranging system as claimed in claim 3, wherein said controller includes an amplitude calibration component, said amplitude calibration component comprising a control component for generating the switching control signal to route the transmit pulse signal to said receiver, another control component to generate the control signal to set a first attenuation level for said attenuator, and said attenuator attenuating said transmit pulse signal according to said first attenuation level, and a first amplitude component for determining an amplitude measurement for the output signal from said receiver corresponding to said first attenuation level, and said amplitude calibration component including a control component to generate the control signal to set a second attenuation level for said attenuator and a second amplitude component for determining an amplitude measurement for the output signal from said receiver corresponding to said second attenuation level, and a processing component for determining an offset value for said receiver based on said first and second amplitude measurements.

6. The time-of-flight ranging system as claimed in claim 5, wherein said calibration module includes a processing component responsive to said first and second amplitude measurements for determining a gain level for said receiver.

7. The time-of-flight ranging system as claimed in claim 3, wherein said controller includes a time delay calibration component, said time delay calibration component comprising a control component for generating the switching control signal to route the transmit pulse signal to said receiver, another control component to generate the transmit pulse signal on a timed basis, and a time delay measurement component for inputting the output signal from said receiver and measuring the time between said transmit pulse signal and the output signal from said receiver.

8. The time-of-flight ranging system as claimed in claim 2, wherein said receiver includes a filter having an adjustable frequency response and being operatively coupled to said controller, said filter having an input coupled to the second switch for receiving the reflected pulse signal or the transmit pulse signal, and said filter being responsive to a control signal from said controller for adjusting the frequency response.

9. The time-of-flight ranging system as claimed in claim 8, wherein said receiver further includes an amplifier, an envelope detector, and an analog-to-digital converter, said amplifier having an input connected to said second switch and an output connected to the input of said filter, and said envelope detector having an input connected to the output of said filter and an output connected to the input of said analog-to-digital converter, and the output of said analog-to-digital converter being connected to an input port on said controller.

10. The time-of-flight ranging system as claimed in claim 8, wherein said controller includes a frequency calibration component, said frequency calibration component comprising a component for generating the transmit pulse signal with a selected frequency, a frequency measurement component for measuring the frequency of the output signal from said receiver corresponding to the transmit pulse signal, and tuning component
for generating the control signal to adjust the frequency response of said filter based on said measured frequency of the output signal.

11. The time-of-flight ranging system as claimed in claim 8, wherein said controller includes a frequency calibration component, said frequency calibration component comprising a filter adjusting component for generating the control signal to set the frequency response of the filter to a first value, a component for generating a plurality of said transmit pulse signals having different frequencies, and an amplitude measurement component for measuring the amplitude of the output signals from said receiver corresponding to said transmit pulse signals and said amplitude measurement component determining the peak amplitude and storing the frequency value associated with said peak amplitude.

12. A method for calibrating a time-of-flight ranging system, said time-of-flight ranging system including a transducer for emitting energy pulses and detecting reflected energy pulses, a transmitter operatively coupled to a controller, and the transducer being responsive to a transmit pulse signal for emitting the energy pulses, a receiver operatively coupled to the controller, and having an input for receiving a reflected pulse signal corresponding to a reflected energy pulse from the transducer, the receiver converting the reflected pulse signal for input by the controller and the controller including a component for determining time-of-flight measurements from the reflected pulse signal, said calibration method comprising the steps of:

(a) bypassing the transducer and looping back the transmit pulse signal to the receiver;

(b) inputting an output signal generated by the receiver in response to the looped-back transmit pulse signal;

(c) measuring characteristics associated with said output signal;

(d) determining calibration parameters from said measured characteristics.

13. The method as claimed in claim 12, wherein said step of measuring characteristics associated with said output signal comprises measuring the amplitude of said output signal.

14. The method as claimed in claim 13, further including the step of varying the frequency of the looped-back transmit pulse signal, and measuring amplitude changes in said output signal, and determining the frequency associated with the maximum amplitude for said output signal.

15. The method as claimed in claim 12, further including the step of attenuating the looped-back transmit pulse signal.

16. The method as claimed in claim 15, wherein said step of measuring characteristics associated with said output signal comprises measuring the amplitude of said output signal.

17. The method as claimed in claim 16, further including the step of varying the frequency of the looped-back transmit pulse signal, and measuring amplitude changes in said output signal, and determining the frequency associated with the maximum amplitude for said output signal.

18. The method as claimed in claim 15, further including the step of measuring a noise floor for the receiver, said noise floor measurement providing an indication of a minimum signal level.

19. The method as claimed in claim 18, wherein said step of measuring of measuring characteristics associated with said output signal comprises measuring the amplitude of said output signal.

20. The method as claimed in claim 12, further including the step of filtering the looped-back transmit pulse signal in the receiver.

21. The method as claimed in claim 20, wherein said step of measuring of measuring characteristics associated with said output signal comprises measuring the amplitude of said output signal.

22. A time-of-flight ranging system comprising:
(a) emitter means for emitting energy pulses and detecting reflected energy pulses;
(b) controller means;
(c) transmitter means for transmitting a transmit pulse signal, said transmitter means being operatively coupled to said controller, and said emitter means having an input port coupled to said transmitter means and said emitter means being responsive to the transmit pulse signal for emitting said energy pulses;
(d) receiver means for receiving a reflected pulse signal, said receiver means being operatively coupled to said controller means, and said emitter means including output means coupled to said receiver for outputting the reflected pulse signal corresponding to a reflected energy pulse coupled by said emitter means;
(e) said receiver means including means for converting said reflected pulse signal for input by said controller means and said controller means including means for determining time-of-flight measurements from said reflected pulse signal;
(f) means for bypassing said emitter means and routing said transmit pulse signal to said receiver means, and said controller means including calibration means for calibrating the output from said receiver.

23. The time-of-flight measurement system as claimed in claim 22, wherein said means for bypassing comprises first switch means and second switch means, said first switch means being coupled between said controller means and said transmitter means, and said second switch means being coupled between said emitter and said receiver means, and said first switch means being responsive to a switching control signal from said controller means for switching said transmit pulse signal to said transmitter means, and said second switch means being responsive to said switching control signal for switching said reflected pulse signal or said transmit pulse signal to said receiver means.

24. The time-of-flight ranging system as claimed in claim 23, wherein said bypass means further includes attenuator means, said attenuator means being responsive to a control signal from said controller means for attenuating said transmit pulse signal.

25. The time-of-flight ranging system as claimed in claim 22, wherein said bypass means includes a noise floor measurement component.

26. The time-of-flight ranging system as claimed in claim 24, wherein said controller means includes means for calibrating amplitude, said means for calibrating amplitude comprising means for generating the switching control signal to route the transmit pulse signal to said receiver means, and means for generating the control signal to set a first attenuation level for said means for attenuating according to said first attenuation level, and a first amplitude means for determining an amplitude measurement for the output signal from said receiver means corresponding to said first attenuation level, and said means for calibrating amplitude including means for a generating the control signal to set a second attenuation level for said means for attenuating and second amplitude means for determining an amplitude measurement for the output signal from said receiver means corresponding to said second attenuation level, and means for determining an offset value for said receiver means based on said first and second amplitude measurements.

27. The time-of-flight ranging system as claimed in claim 26, wherein said means for calibrating includes a processing component responsive to said first and second amplitude measurements for determining a gain level for said receiver means.

28. The time-of-flight ranging system as claimed in claim 24, wherein said controller means includes means for calibrating time delay comprising means for generating the switching control signal to route the transmit pulse signal to said receiver means, and means for generating the transmit pulse signal on a timed basis, and means for inputting the output signal from said receiver means and measuring the time between said transmit pulse signal and the output signal from said receiver means.

29. The time-of-flight ranging system as claimed in claim 23, wherein said receiver means includes means for filtering, said means for filtering having an adjustable frequency response and being operatively coupled to said controller means, said means for filtering having an input coupled to the second switch means for receiving the reflected pulse signal or the transmit pulse signal, and said means for filtering being responsive to a control signal from said controller means for adjusting the frequency response.

30. The time-of-flight ranging system as claimed in claim 29, wherein said receiver means further includes amplifier means, envelope detector means, and analog-to-digital converter means, said amplifier means having an input connected to said second switch means and an output connected to the input of said means for filtering, and said envelope detector means having an input connected to the output of said means for filtering and an output connected to the input of said analog-to-digital converter means, and the output of said analog-to-digital converter means being connected to an input port on said controller means.

31. The time-of-flight ranging system as claimed in claim 29, wherein said controller means includes means for calibrating frequency comprising a component for generating the transmit pulse signal with a selected frequency, means for measuring the frequency of the output signal from said receiver means corresponding to the transmit pulse signal, and tuning means for generating the control signal to adjust the frequency response of said means for filtering based on said measured frequency of the output signal.

32. The time-of-flight ranging system as claimed in claim 29, wherein said controller means includes means for calibrating frequency comprising a filter adjusting means for generating the control signal to set the frequency response of said means for filtering to a first value, means for generating a plurality of said transmit pulse signals having different frequencies, and amplitude measurement means for measuring the amplitude of the output signals from said receiver means corresponding to said transmit pulse signals and said amplitude measurement means determining the peak amplitude and staring the frequency value associated with said peak amplitude.

* * * * *